United States Patent [19]
Murray, Jr.

[11] 3,987,466
[45] Oct. 19, 1976

[54] SWITCHING DEVICE FOR AN AUTOMATIC CAMERA

[75] Inventor: Joseph E. Murray, Jr., Malden, Mass.

[73] Assignee: Polaroid Corporation, Cambridge, Mass.

[22] Filed: Mar. 3, 1975

[21] Appl. No.: 554,765

[52] U.S. Cl. .................................... 354/83; 354/86; 354/173; 354/212; 354/283
[51] Int. Cl.² .................... G03B 17/34; G03B 17/53
[58] Field of Search .............. 354/83, 86, 173, 174, 354/202, 212, 275, 276, 277, 283, 289

[56] References Cited
UNITED STATES PATENTS

| | | | |
|---|---|---|---|
| 3,750,551 | 8/1973 | Land et al. | 354/83 |
| 3,760,701 | 9/1973 | Paglia | 354/83 X |

Primary Examiner—Joseph F. Peters, Jr.
Attorney, Agent, or Firm—Alfred E. Corrigan; Kenneth W. Anderson

[57] ABSTRACT

A switching device for use in a fully automatic camera including a chamber for receiving and locating a disposable cassette therein such that a foremost member of an assemblage, including photosensitive film units in stacked relation and a dark slide cover in superposition thereto, is positioned at an exposure station of the camera. The device may be manually or automatically activated to initiate actuation of a film advancing apparatus for removing the foremost member from within the cassette and the exposure station and to advance the foremost member to a processing station within the camera whereupon the foremost member, in the case of a film unit, is processed and delivered through an opening to the exterior of the camera. The device is automatically activated when the cassette is inserted into the receiving chamber and secured therein by the movement of a loading access door from an open to a closed, latched position whereupon the dark slide cover is removed from within the camera. The device is manually activated by the action of an operator depressing an actuator included upon the camera to initiate exposure of the foremost photosensitive film unit and, subsequent to exposure, to remove the exposed film unit from within the camera.

15 Claims, 6 Drawing Figures

SWITCHING DEVICE FOR AN AUTOMATIC CAMERA

REFERENCE TO RELATED APPLICATION

This application is related to copending application Ser. No. 554,764 filed on Mar. 3, 1975 herewith in the names of David Van Allen and Bruce K. Johnson and entitled "Exposure Counter For Automatic Camera".

BACKGROUND OF THE INVENTION

1. Field of the Invention

The invention relates to the field of photography and, more particularly, to a photographic apparatus including a switching device which may be actuated manually and automatically to initiate a cycle whereby a foremost member of a film laden cassette intimately including an opaque light shield is removed.

2. Description of the Prior Art

Cameras intended for use by amateur photographers are designed with a viewpoint of reducing requisite preparatory adjustments for obtaining a quality finished print of a desired scene. Numerous automatic features have been introduced to minimize both post-exposure and pre-exposure camera preparations thereby requiring only nominal operator participation. Cameras incorporating self-processing features have been devised wherein previous manually operated roller systems for processing film units having a processing liquid between elements of the film units have been replaced by motorized roller systems which automatically process the film units following an exposure thereof. Film loading has been simplified with the introduction of disposable film cassettes designed for positioning photosensitive surfaces of the film unit at an exposure plane of the camera merely by direct insertion of the cassette into a receiving chamber included within the camera. Such a cassette is described and claimed in detail in U.S. Pat. Nos. 3,543,662; 3,651,746; and 3,705,542 wherein a selected number of photosensitive film units preferably of the self-developing type and intimately including therein an opaque light shield or dark slide cover in superposition to the film units are arranged in stacked relation and adapted to be sequentially presented at the exposure plane of the camera. The cassette is adapted for use with an automatic camera which operates to expose, process and transport individual film units each of which is formed incorporating a pod of processing fluid which is spread within each film unit to initiate formation of a visible positive image.

The cassette includes a housing formed to provide a film frame opening which when positioned within a receiving chamber of the camera sequentially positions each foremost member of an assemblage of the film units and the dark slide at the exposure plane of the camera. The assemblage is arranged in stacked relationship with the dark slide cover as a foremost member of the assemblage. Prior to insertion of the cassette into the receiving chamber, the dark slide cover is positioned over a film frame opening to secure light from the opening and protect the photosensitive surfaces of the film units. The dark slide is subsequently removed after the cassette has been properly positioned within the receiving chamber of the camera.

Improved versions of cameras adapted for use with the cassette have employed a variety of switching devices and complex electrical control circuits which automatically remove the dark slide from within the cassette when the cassette is inserted into the receiving chamber and the receiving chamber rendered light-tight. A typical example of a photographic apparatus including such a control system is described in detail in U.S. Pat. No. 3,750,551 issued to Edwin H. Land and Peter P. Garcia, on Aug. 7, 1973, wherein automatic removal of a dark slide cover is carried out upon the closing of designated switches within the system to initiate a dark slide ejection cycle which substantially overrides a normal operational photographic exposure cycle of the camera. One of the switching members, closed to activate the dark slide ejection cycle, is employed only during the dark slide ejection cycle and is subsequently disengaged upon the completion of the cycle and remains disengaged throughout each normal operational exposure cycle. When the cassette is emptied, removed from within the receiving chamber, and replaced by a fresh cassette, the switching member is again employed but once again only during the dark slide ejection cycle. Therefore, subsequent to the dark slide ejection cycle, exposed film units are removed from their underlying position within the cassette and processed by actuating a second switching member which activates a normal operational cycle of the camera having an exposure cycle and a processing cycle wherein the exposed film unit is ejected from the camera. A control system of this type includes a switching member which is employed only once during any of the operational cycles of the camera and further requires additional switching members and may include an electrical control circuit design requiring additional components to prevent the normal operational photographic exposure cycle from operating during the dark slide ejection cycle. Such a control system may be considered unduly complex and lacking in efficient use of components thereby resulting in an expense which is not warranted to provide substantially similar preexposure and post-exposure operations. In accordance with the present invention, it will be seen that a substantially similar simplified operation is completed satisfying all the necessary requirements, i.e., performing substantially similar functions as described in the prior art by utilizing a switching feature, which is highly reliable and incorporates substantially fewer parts.

SUMMARY OF THE INVENTION

The present invention is addressed to an improved switching device for a fully automatic camera of a type accepting a film assemblage including a dark slide film cover included within a cassette of unitary construction. The cassette further includes spaced forward and rear walls, a pair of side walls, and leading and trailing end walls which cooperate to enclose a plurality of flexible film units preferably of the type more fully described in U.S. Pat. No. 3,415,644 issued to Edwin H. Land on Dec. 10, 1968. The cassette's top wall is provided with a rectangular exposure aperture which is generally coextensive with the area of the film unit to be exposed, and at least one elongated slot which extends rearwardly along one lateral side of the top wall and at least part way down the cassette's trailing end wall. The leading end wall of the cassette is provided with an elongated exit slot through which the dark slide cover and the film units may be moved, one at a time, i.e., the slot has a depth only slightly greater than the thickness of one film unit and less than the combined thickness of two film units as more fully described in U.S. Pat. No. 3,779,770 issued to William Alston et al. on Dec. 18, 1973.

The cassette houses a plurality of film units in stacked relationship for sequential presentation at the exposure plane, a dark slide cover in superposition thereto, a resilient platen positioned between the stack of film units and a battery located adjacent the cassette's rear wall. The platen is provided to urge a foremost film unit against the forward wall such that its photosensitive surface is located in position for exposure and the leading edge of the film unit is in alignment with the exit slot.

The cassette is adapted to be located within a receiving chamber of the camera with the foremost member of the assemblage positioned in the exposure plane of the camera. Mounted within the camera is a film advancing apparatus including an engaging member which is adapted to extend into the slot in the cassette's top and trailing end walls and engage a foremost member of the assemblge, which may be the dark slide cover or a film unit, at its trailing edge prior to moving it through the exit slot in the cassette and into the bite of a pair of pressure-applying members mounted adjacent a leading end of the foremost member. The pressure-applying members are adapted to receive the foremost member as it moves out of the exposure position through the exit slot and drive the foremost member toward the exterior of the camera.

The camera includes a control arrangement having a switching device which selectively activates the film advancing apparatus automatically in response to the positioning of the cassette within the receiving chamber and to the movement of a loading access door to a closed position wherein the cassette is secured within the receiving chamber. With this arrangement, automatic ejection of the dark slide may be realized only following a proper insertion of the cassette within the receiving chamber.

The switching device is further utilized to manually activate a photographic cycle for the camera wherein a photosensitive surface of a film unit is exposed and subsequently moved out of the exposure position within the cassette and into the bite of the pressure-applying members for subsequent movement to the exterior of the camera. Therefore, the switching device is employed during the dark slide cover ejection cycle and also during each exposure cycle.

One of the components of the switching device is a plurality of contact members mounted in a fixed position for contact with a strip of electrically conductive material mounted upon a rotatable indexing member for automatically activating the film advancing apparatus during the dark slide cover ejection cycle. Another component is a pivotally mounted, manually operated actuating member which is employed to contact the group of contact members to activate the photographic cycle and the film advancing apparatus for removal of an exposed film unit from the exposure plane to the exterior of the camera. When the receiving chamber of the camera is empty, the indexing member is in a starting position wherein the electrically conductive strip is in contact with the fixed group of contact members. When a cassette is inserted within the empty receiving chamber of the camera and the loading access door is closed and latched to secure the receiving chamber of the camera against ambient light, the contact between the fixed component and the conductive strip activates the film advancing apparatus whereupon the dark slide cover is moved out of the exposure plane and into the bite of the pressure-applying members thereby uncovering the photosensitive surface of the foremost film unit.

Once the dark slide ejection cycle is underway, the indexing member is rotated a distance sufficient to disengage the conductive strip from the fixed contact members whereupon the contact is broken and the dark slide ejection cycle completed. A photosensitive surface of the foremost film unit is urged by the platen into the exposure plane whereupon the manually operated actuating member is pivotally moved by the operator into contact with the fixed contact members of the switching device to initiate an exposure cycle, whereupon the photosensitive surface of the foremost film unit is exposed to actinic radiation through a lens assembly and subsequent to the exposure, the film unit is removed from the exposure plane and into the bite of the pressure-applying members for processing and removal from the camera. Each exposure and removal of subsequent film units is activated by the contact between the fixed component and the manually operated contact member. The indexing member is rotatably indexed upon each movement of the manually operated contact member unitl the cassette is emptied whereupon the indexing member is in a terminal position. When the empty cassette and its battery are removed from within the receiving chamber, the indexing member is returned to the starting position wherein the conductive strip and the fixed component are reengaged in contact.

As previously mentioned, the cassette structure is one incorporating a battery power supply for supplying energy to the systems within the camera. Therefore, the contact made between the conductive strip and the group of contact members during the period wherein the receiving chamber is empty results in an open circuit condition for the film advancing apparatus. The dark slide cover cannot be removed and inadvertently expose the film within the cassette until such time as a new cassette is inserted within the receiving chamber and the receiving chamber secured.

Accordingly, an object of the present invention is to provide a photographic apparatus for use with a film cassette having a plurality of photosensitive film units in stacked relationship and a dark slide cover in superposition to the film units for protecting the photosensitive surfaces of the film units prior to insertion within a receiving chamber therefor in a camera including an improved switching device utilized in automatically initiating removal of the dark slide cover when the cassette is properly positioned at an exposure plane of the camera and in initiating, upon manual actuation, sequential removal of film units from the exposure plane subsequent to exposure thereof.

Other objects of the invention will in part be obvious and will in part appear hereinafter.

The invention accordingly comprises the apparatus possessing the construction, combination of elements and arrangement of parts which are exemplified in the following disclosure and the scope of the application which will be indicated in the claims.

BRIEF DESCRIPTION OF THE DRAWINGS

For a fuller understanding of the nature and objects of the invention, reference should be made to the following detailed description taken in conjunction with the accompanying drawings wherein.

DETAILED DESCRIPTION OF THE INVENTION

The instant invention is adapted to be incorporated into any camera, preferably an automatic camera, which includes a receiving chamber for accepting a film laden cassette structure having a dark slide cover. In the preferred embodiment the dark slide cover is automatically ejected from the camera by inserting the cassette within the receiving chamber of the camera and closing a loading door to secure the cassette therein. The underlying unexposed film units within the cassette are subsequently removed individually from the camera pursuant to being exposed by manually activating the advancing apparatus. The automatic and manual activation of the advancing apparatus is performed by a switching device which is automatically and manually actuated to activate the advancing apparatus.

The switching device can be described as being physically contacted to activate the advancing apparatus by either an automatically actuated or manually actuated contact member included therein and therefore either contact member may be utilized in activating the advancing apparatus. The determinant as to which contact member shall be employed to activate the advancing apparatus and other features and variations in performance shall be more clearly defined as the description unfolds.

Figure 1:
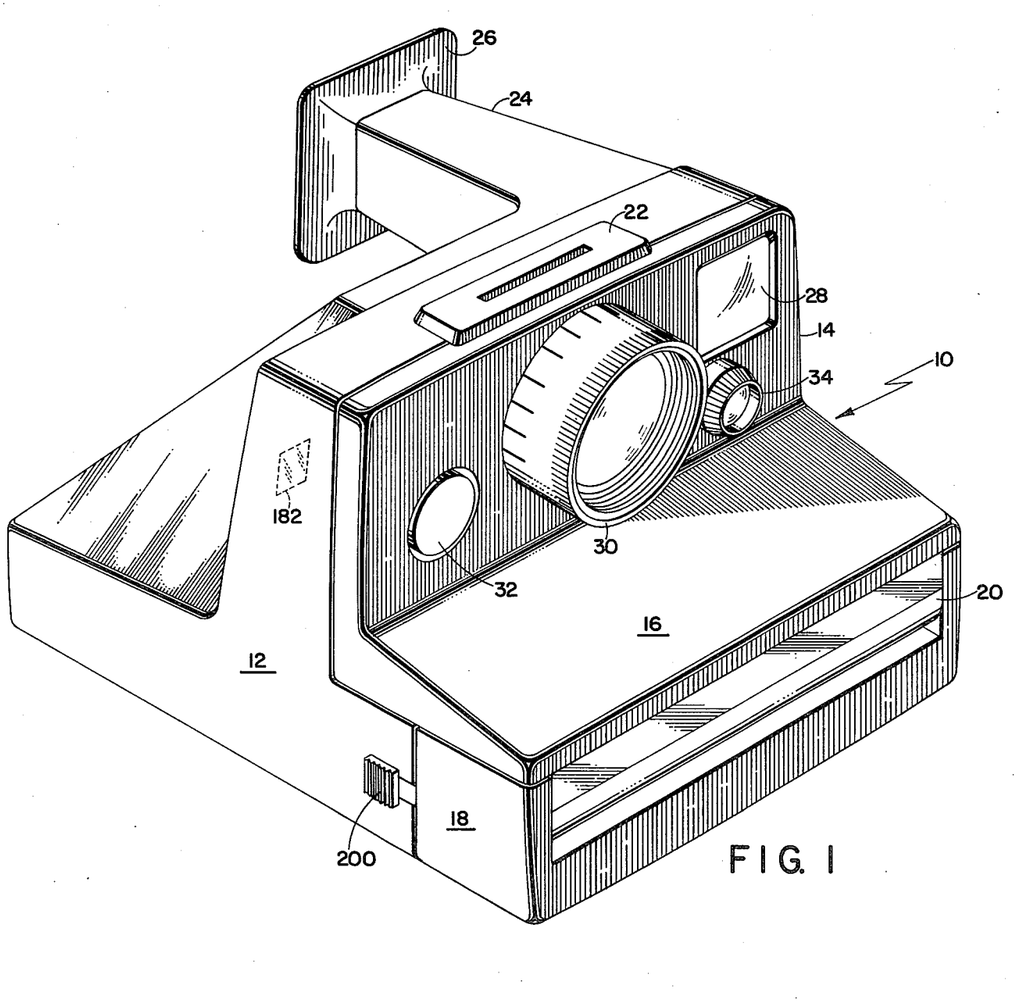
FIG. 1 is a pictorial representation of a hand held camera of the type wherein a novel switching apparatus is employed.

Referring in more detail by reference characters to FIG. 1, a fully automatic camera incorporating the features of the instant invention is portrayed generally at 10. Housing components of camera 10 comprise a body section 12 attached to a cover 14 integrally including an apron 16 and a loading access door 18 pivotally mounted to swing in a downward direction to present an entrance to a receiving chamber in the body section 12 of the camera 10.

The loading door is provided with an opening 20 through which each member of a film assemblage is at least partially advanced. The body section 12 includes a mounting receptacle 22 for a flash attachment upon an upper surface thereof and an integral viewfinder housing 24 including an eyepiece 26 through which an operator may view a desired subject or scene. The cover 14 includes a viewfinder window 28 which offers protection for internal components within the viewfinder housing 24 and further describes an outline used by the operator to frame to desired subject or scene to be photographed. A lens assembly 30 cooperates with a shutter assembly to define an optical path through which actinic radiation received through the lens assembly 30 is presented at the exposure plane of the camera 10. The cover 14 further includes a manually operated actuator button 32 and a photometric assembly 34 which receives incident radiation from the desired scene and provides electrical signals to an exposure control system similar to that shown and described in considerable detail in U.S. Pat. No. 3,762,299, issued to Lawrence M. Douglas on Oct. 2, 1973.

Figure 2:
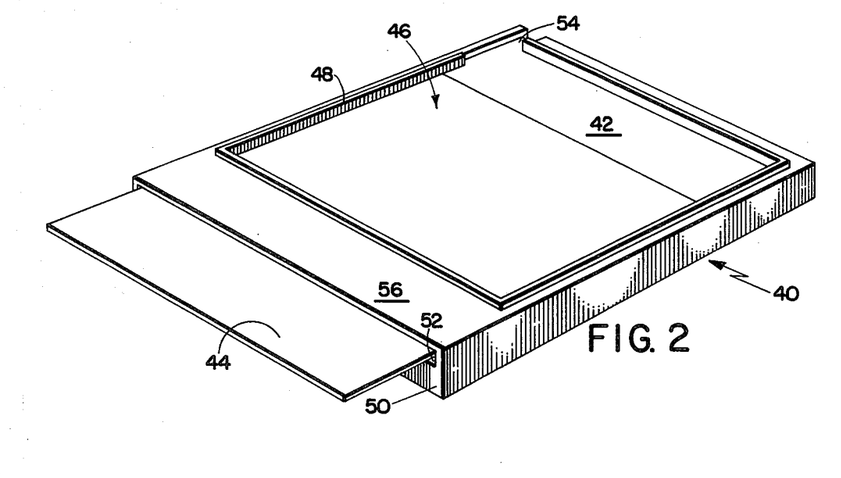
FIG. 2 is a perspective view of a cassette structure insertable within the camera of FIG. 1.

Looking at FIG. 2, a cassette 40 for use with the camera 10 is shown having a generally flat, rectangular shape and a stacked assemblage including film units 42 and a dark slide cover 44 in superposition thereto. The photosensitive surfaces of the film units 42 are arranged for sequential presentation at a light entrance portion 46 formed in an upper surface of cassette 40. Entrance portion 46 has a periphery which is defined by a ridge 48 the underside of which serves as a seat against which each foremost member of the assemblage abuts. A forward wall 50 of the cassette 40 is formed having an elongated slot 52 disposed thereacross. Slot 52 serves as an egress providing for the sequential removal of each of the foremost members of the assemblage, i.e., film units 42 and dark slide cover 44. Cassette 40 also is formed having a slot or opening in an upward face thereof as at 54. Opening 54 permits an insertion of a pick member of a film advancing apparatus which functions to impart initial movement to units 42 and 44 as they are removed from the cassette 40. When the assemblage is formed within the cassette 40, the photosensitive film units 42 contained therein are secured from light otherwise entering light entrance 46 by the dark slide cover 44 having a configuration substantially similar to the underlying film units 42. Once the cassette 40 is positioned within its receiving chamber in the camera 10, the dark slide cover 44 must be removed prior to commencing a first photographic cycle.

Figure 3:
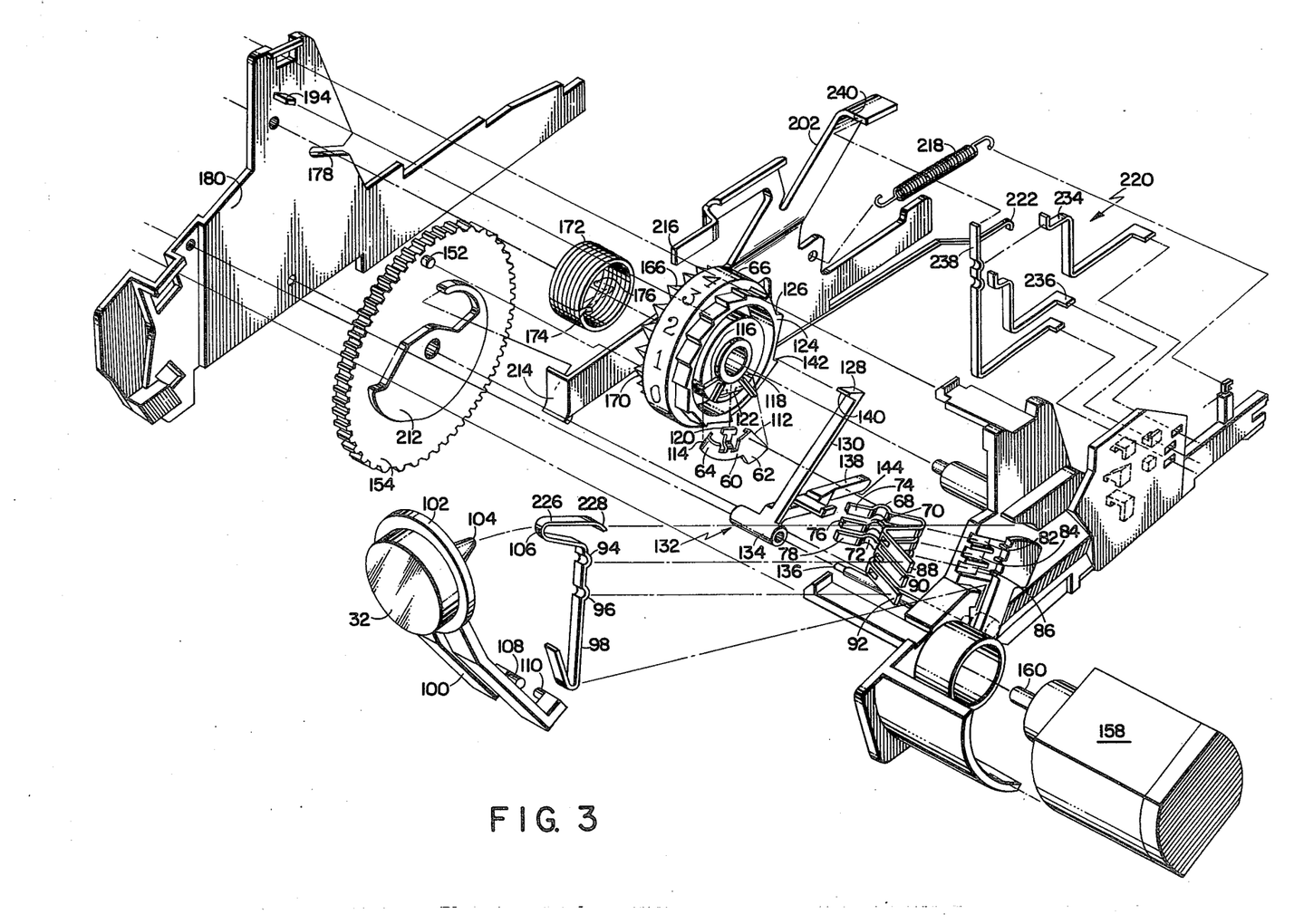
FIG. 3 is an enlarged exploded view of a switching apparatus and its related structure perspectively shown in their related positions.
Figure 4:
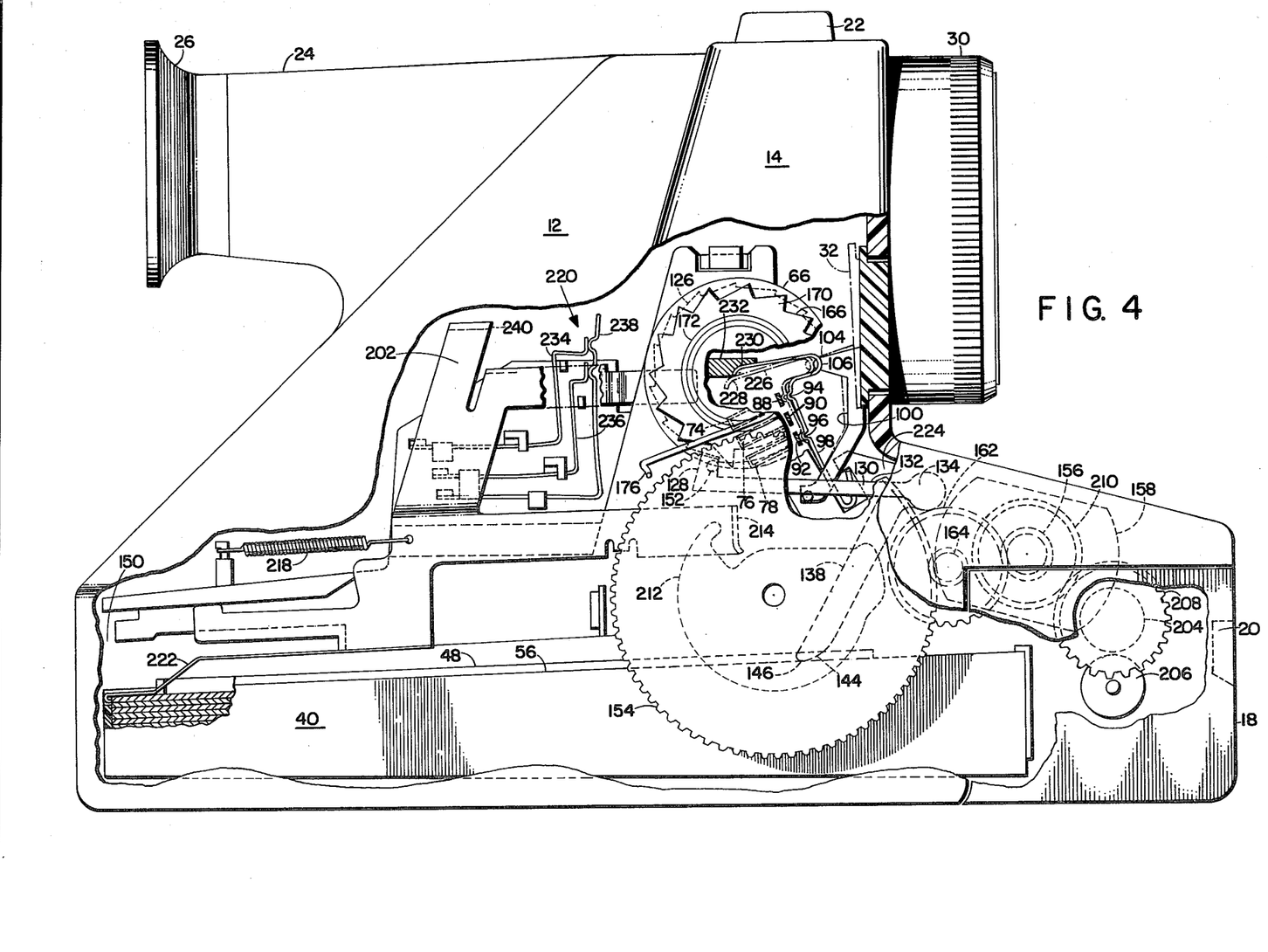
FIG. 4 is an enlarged side view of the switching apparatus in an operating mode within the camera of FIG. 1, the view having portions broken away to reveal internal structure.

In FIG. 3, the components forming the present invention and related portions of the camera 10 which are relevant thereto are shown. The switching device comprises an electrically conductive strip 60 having a configuration such that a first end 62 is substantially greater in area than a second end 64. The strip 60 is mounted upon one side of a cylinder 66 for wiping contact upon extended surfaces of wiping tips 68, 70 and 72 of contact members 74, 76 and 78, respectively. The contact members 74, 76 and 78 are mounted within grooves 82, 84 and 86, respectively, provided therefor upon a surface of housing 80 and positioned such that contact surfaces 88 and 92 are in position to be in contact with contact knobs 94 and 96 of resilient member 98. An actuator assembly 100 includes a flange 102 having the actuator button 32 mounted upon one side thereof and a nipple 104 on an opposing side of the flange 102 for contact with a striking surface 106 of resilient member 98. When the actuator button 32 is depressed to activate a photographic cycle for the camera, the actuator assembly 100, which is mounted for pivotal movement about an axis established by mounting pins 108 and 110, moves pivotally forward to permit nipple 104 to contact and push against striking surface 106 of resilient member 98 mounted in a fixed position within a frame (shown in FIG. 4) whereby the resilient member 98 is flexed and contact knobs 94 and 96 are forced into contact with contact surfaces 88 and 92 of contact members 74 and 78, respectively, as best shown in FIG. 4.

The conductive strip 60 further includes mounting tabs 112 and 114 which are inserted into mounting slots 116 and 118 respectively of the cylinder 66 and a resilient tab 120 which is flexibly inserted into a receiving slot 122 such that the conductive strip 60 is fixedly located upon one side of the cylinder 66. When the cylinder 66 is in a starting position, first end 62 of the strip 60 is in contact with wiping tips 68, 70 and 72 of contact members 74, 76 and 78. When the cylinder 66 is in an end or terminal position, second end 64 is placed in contact with wiping tips 68 and 70 of contact members 74 and 76 only as a result of the difference in the area provided by the configuration of the first and second ends 62 and 64 of the electrically conductive strip 60. The cylinder 66 is rotated in a clockwise direction as viewed in FIG. 3. When indexed out of the starting position further contact between conductive strip 60 and the tips is prevented until the cylinder 66 arrives at the terminal or end position. Such a design has a substantial number of advantages among which is the fact that the contacting surfaces are in a fixed preloaded mounting and are thereby provided with a relatively high contact force while undergoing a minimum amount of displacement and maintained in a substantially clean condition due to the wiping action between the strip 60 and the wiping tips 68, 70 and 72. The electrical significance and the results due to the variation in contact made between wiping surfaces 68, 70 and 72 and first and second ends 62 and 64 respectively shall be described later with reference to FIG. 6.

A release ratchet member 124 having a plurality of notches 126 spaced around a periphery thereof is mounted upon one side of cylinder 66 for engagement with a release pawl 128 formed upon a tip of a first member 130 of a monitoring device 132. The monitoring device 132 includes a cylindrical mounting member 134 for pivotally mounting the monitoring device 132 upon a mounting pin 136 protruding from an inner wall of frame 80. The cylindrical mounting member 134 has a second member 138 extending therefrom which is angularly spaced thereon from the first member 130 in a predetermined direction. The monitoring device is pivotally mounted for movement between a first position wherein a surface 140 of pawl 128 is out of engagement with surface 142 of notch 126 and a surface 144 of the second member 138 is located in the path of travel of a film cassette 40 being inserted into the camera's film chamber 150, and a second position wherein the forward wall 56 of the film cassette 40 holds the pawl 128 in engagement with a notch 126, as shown in FIG. 4. Stated another way, when the leading end wall 50 of the cassette 40 strikes surface 144 of second member 138, the monitoring device 132 pivots in a clockwise direction as viewed in FIG. 4 whereupon tip 146 slides upon the sloping surface of forward wall 56 of the cassette 40 during the continued insertion of the cassette 40. Once the cassette 40 reaches its terminal position within the film receiving chamber 150, surface 140 of pawl 128 is latched beneath an underlying surface 142 of notch 126. The monitoring device 132 is retained in the second position by the wall 56 bearing against tip 146 of second member 138 whereby the cylinder 66 is permitted to rotate unidirectionally, i.e., clockwise as viewed in FIG. 3 and counterclockwise as viewed in FIG. 4. During the removal of the cassette 40 from within receiving chamber 150, tip 146 slides upon wall 56 until it is no longer in contact therewith, whereupon, the monitoring device 132 is free to pivotally fall into the first position wherein second member 138 is in position within the receiving chamber 150 for contact with the entering edge of the freshly inserted cassette 40 and release pawl 128 pivotally moved out of engagement with the underlying surface 142 of notch 126.

The cylinder 66 is rotatably driven by a drive pin 152 included upon one side of a timing gear 154. The timing gear 154 is coupled to a drive gear 156 of motor 160 through a pair of intermediate gears 162 and 164 for rotation in a counterclockwise manner, as viewed in FIG. 3. When the motor 158 is set in motion, timing gear 154 completes one revolution during the entire operational cycle. Drive pin 152 contacts and thereby pushes against one of a plurality of teeth 166 spaced around a periphery of a drive ratchet member 170 included upon a second side of cylinder 66 opposite to the release ratchet member 124. The cylinder 66 supports printed indicia around an outer periphery thereof for indicating the number of exposures available within the camera 10 and an indicia designating a status wherein no cassette 40 is properly present within the receiving chamber 150. The latter status is described herein as the starting position.

With the above combination of components, when the monitoring device 132 is set in the second position and the motor 158 is set into motion, the timing gear 154 is driven and the drive pin 152 momentarily engages one of the teeth 166 of drive ratchet member 170 whereby cylinder 66 is rotatably indexed in a clockwise direction as reviewed in FIG. 3 and counterclockwise in FIG. 4. During this rotation, a spirally curved spring 172 having one end 174 coupled to the cylinder 66 and a second end 176 fixedly attached within slot 178 of a second frame 180 is incrementally wound. The second frame is adapted to receive a variety of self-locking attachment members extending from frame 80 whereby first and second frames 80 and 180, respectively, are secured to each other. When the cylinder 66 is indexed one tooth 166, the notch engaging tip portion 140 of release pawl 128 engages an appropriate one of the notches 126 of release ratchet member 124 thereby preventing the cylinder 66 from moving out of its new position.

As evidenced in FIG. 4, when the cassette 40 is properly positioned within the receiving chamber 150 of camera 10, the monitoring device 132 is moved into the previously described second position wherein release pawl 128 is engaged with one of the notches 126 of release ratchet member 124. The cylinder 66 is at that time in the starting position wherein end 62 of strip 60 is in contact with wiping tips 68, 70 and 72 of contact members 74, 76 and 78 respectively. Wiper tips 68, 70 and 72 are arranged for slideable engagement with the semicircular strip 60 mounted upon the release ratchet member 124. Strip 60 is configured of such length as to be in contact with contact members 74, 76 and 78 only at such time as a proper indicia indicates that the dark slide cover 44 is to be removed from the cassette 40, said indicia being visible through a counter viewing window 182 included in body section 12.

Figure 5:
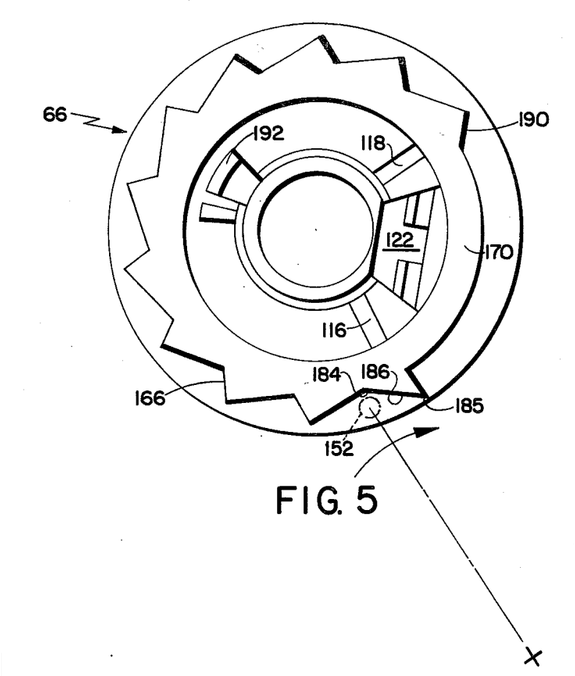
FIG. 5 is an enlarged side view of one of the component parts of the switching apparatus.

In FIG. 5, the cylinder 66 is shown as viewed from the side of the cylinder 66 upon which the drive ratchet member 170 is mounted. Teeth 166 are spaced around the periphery of the drive ratchet member 170 and cooperate with the drive pin 152 to index or rotate the cylinder 66 and thereby sequentially align the proper indicia with the counter viewing window 182. The height of one of the end teeth, as measured from a point 184 on the root circle for all of the teeth to an end 185 of the end tooth, is substantially greater than any of the remaining teeth 166 formed on ratchet member 170 and is the first tooth to be contacted by drive pin 152 during the automatic removal of the opaque dark slide cover 44. This increased height permits the drive pin 152 to remain in contact with surface 186 for a relatively greater period of time thereby increasing the angular displacement of cylinder 66 and substantially assuring that the contact between the strip 60, mounted upon an opposing side of the cylinder 66, and wiping tips 68, 70 and 72 of contact members 88, 90 and 92 respectively is broken.

The cylinder 66 is indexed out of the starting position during the automatic removal of the dark slide cover 44 into a first position wherein the previous indicia designating dark slide cover removal is moved out of alignment with the counter viewing window 182 and replaced by an indicia designating the number of film units 42 available in the cassette for exposure. For every actuation of the manually operated actuator button 32, a photographic cycle is activated and contact is made between contact knobs 94 and 96 and contact surfaces 88 and 92 for exposing, and subsequent thereto, removing the exposed film unit 42 from the exposure plane of the camera 10. The cylinder 66 is indexed or rotated upon each depression of the actuator button 32 and a new indicia presented in the counter viewing window 182 until cylinder 66 arrives at the terminal or end position whereat the cassette 40 is empty and an indicia designating such is presented to the counter viewing window 182. Once the cassette 40 has been emptied, depressing the actuator button 32 provides no further indexing or rotating of the cylinder 66, as the drive pin 152 during removal of the last exposed film unit 42 contacts surface 190 of the last tooth and indexes the cylinder 66 to a position wherein drive pin 152 is beyond surface 190 and there are no remaining teeth to engage. Removal of the empty cassette 40 allows the monitoring device 132 to pivot into the first position thereby moving release pawl 128 and notch engaging tip portion 140 out of engagement with the last notch 126 it was previously in contact with. As a consequence, cylinder 66 is rotated counterclockwise as viewed in FIG. 3 and clockwise as viewed in FIGS. 4 and 5, under the bias of spring 172 until a stop member 192 included upon cylinder 66 is moved into position to contact interceptor 194 extending from one side of second frame 180 whereupon the cylinder 66 is halted at the starting position.

In order to gain access to the receiving chamber 150, loading access door 18 is released by manually actuating latching device 200. When cassette 40 is inserted into the receiving chamber 150, the terminals of the battery (not shown) included within the cassette contact a pair of battery contacts disposed within the receiving chamber 150 to provide power for various subsystems of the camera 10 (shown in FIG. 6). A full description of this interface is disclosed in U.S. Pat. No. 3,705,537 issued to Richard Paglia on Dec. 12, 1972. When the loading access door 18 is moved into the given closed position, as illustrated in FIG. 4, it is latched by the latching device 200 thereby securing the cassette within the receiving chamber 150. As a function of the closure, a switch, designated as S-3 in FIG. 6, cooperates with latching device 200 in an interlock function described in detail in a copending application Ser. No. 502,161, filed on Sept. 6, 1974 in the name of Andrew S. Ivester et al. and signals the photographic systems electronics that the receiving chamber 150 has been secured. As previously described, the cylinder 66 has been returned to the starting position upon the removal of a cassette from within the receiving chamber 150 wherein the conducting strip 60 and the wiper tips 70, 72 and 74 are in contact with each other. This contact automatically activates a film advancing apparatus 202 of a type disclosed in a related copending application Ser. No. 554,777 filed on Mar. 3, 1975 herewith in the name of Bruce K. Johnson et al. and entitled "Photographic Apparatus With Sequencing System" which advances a foremost member of the assemblage within the cassette, which can be the dark slide cover 44 or a film unit 42, through the elongated slot 52 of cassette 40 and into the bite of a pair of pressure-applying members or rollers 204 and 206 driven by roller gear 208, mounted upon roller 204 and in engagement with and driven by gear 210. The rollers 204 and 206 are used to provide compressive pressure whereby a fluid processing composition within the film unit 42 is spread across the photosensitive surface of the film unit 42. The rollers 204 and 206 also operate as a transport system in advancing the film unit 42 at least partially through the opening 20 of camera 10. In the case wherein the dark slide cover 44 is removed, the rollers provide the transport function only during operation.

Once the foremost member of the assemblage has been removed from the exposure plane, an immediate underlying film unit is elevated by the platen (not shown) included in cassette 40 into the exposure plane of camera 10. The operator frames the desired scene through the viewfinder window 28, focuses the camera and depresses actuator button 32. The lens shutter is maintained in a closed or latched position except for when the operator desires for actinic radiation to be permitted to enter through the lens to expose the photosensitive surface of the film unit 42 positioned at the exposure plane. The camera's shutter mechanism is biased by a resilient member towards an open position and is returned to a closed position against a biasing force of the resilient member by a solenoid operating to return the shutter mechanism to the closed position. Depressing the actuator button 32 pivotally moves the actuator assembly 100 forward into the cover 14 whereupon nipple 104 strikes against striking surface 106 of resilient member 98. The resilient member 98 is deflected into a first position whereby contact knobs 94 and 96 of resilient member 98 are moved into contact with contact surfaces 88 and 92 respectively of contact members 74 and 78 thereby electrically coupling 88 and 92 together. It is this contact initiated by the manual action of the operator which activates the film advancing apparatus 202 whereby the shutter mechanism is unlatched, an electrical switch rendered closed to provide power to the control circuit of the camera, the shutter mechanism relatched, and the exposed film unit removed from the exposure plane of the camera 10 and advanced into the bite of the processing rollers 204 and 206 for processing and subsequent movement through the opening 20 to the exterior of the camera 10 whereupon the switch is opened to terminate the cycle.

The contact produced by the manual actuation of actuator assembly 100 between contact knobs 94 and 96, and contact surfaces 88 and 92 respectively, energizes motor 158 for a relatively short period of time to actuate gears 156, 162 and 164 which in turn drive timing gear 154. The timing gear 154 which rotates one revolution per exposure cycle includes a profile cam 212 upon a side shared with drive pin 152. The profile cam 212 is coupled to the film advancing apparatus 202 by cam follower 214 which rides upon a surface provided therefor on cam 212. Therefore, the position of the film advancing apparatus 202 is responsive to the relative position of the cam follower 214 on cam 212 which in turn is directly dependent upon the angular disposition of the timing gear 154.

The film advancing apparatus 202 is stored in a forward, i.e., in the direction of the loading access door 18, position when inoperative. The biased-open shutter mechanism is latched in a closed position by a shutter mechanism latch release 216 which is in contact therewith and prevents the shutter mechanism from opening. A normally closed power-on switch assembly 220, consisting of conductive members 234 and 236 and contact member 238, is mounted in a fixed position upon frame 80. Contact member 238 is forcibly retained out of contact with conductive members 234 and 236 by arm 240 provided therefor upon film advancing apparatus 202. When the actuator button 32 is depressed and the actuator assembly 100 is moved into the second position, the motor 158 is energized and operates to move the timing gear 154 and thereby cam 212 a sufficient amount to release the film advancing apparatus 202 for movement in a direction away from the access door 18 or in a rearward direction under the bias of a spring 218. The shutter mechanism is unlatched or released by the rearward movement of the apparatus 202 whereby the shutter mechanism latch release 216 mounted upon the film advancing apparatus 202 is removed from engagement with the spring biased shutter mechanism thereby permitting the shutter blades to open. The relative movement of the cam follower 214 upon cam 212 accompanied by the action of return spring 218 move the film advancing apparatus 202 all the way to the rear of the camera 10, whereupon the normally closed power-on switch assembly 220 is closed by the removal of engaging arm 240 from its contact position with contact member 238 permitting the contact member 238 to move into contact with conductive members 234 and 236.

During the closure of the power on switch assembly 220, the shutter mechanism remains open and the switch assembly 220 applies electronic breaking to the motor 158. Closing of the switch assembly 220 provides contact between conductive member 234 and contact member 238 which is responsible for the electronic braking of the motor 158 and further directs a logic command to an electronic circuit, designated as photographic systems electronics in FIG. 6, to cooperate with the photometric assembly 34, during its operation in integrating the light available at the desired scene, to provide proper exposure for the film unit. The simultaneous contact between conductive member 236 and contact member 238 connects the power source to the photographic systems electronics whereby the power required for operation thereof is supplied and further permits the operator to remove his finger from the actuator button 32 by keeping the power to the circuit on for operation thereof pursuant to the breakin contact between actuator assembly 100 and contact members 74 and 78.

Upon receiving sufficient light for proper exposure, the shutter mechanism is closed by a solenoid electronically actuated to force the spring biased shutter mechanism back into the closed position upon receiving a signal from the photometric assembly 34. The motor is energized for a second time by the sustained closing of the power on switch assembly 220 and the timing gear 154 is rotated thereby, whereupon the film advancing apparatus 202 is moved to an intermediate position wherein the power on switch assembly 220 remains closed to drive rollers 204 and 206. A pick device 222, mounted upon film advancing apparatus 202, is employed to engage a foremost exposed film unit and move it through elongated slot 52 disposed in the leading end wall 50 of cassette 40 and into the bite of point of tangency between rotating processing rollers 204 and 206. When the apparatus is moved from the intermediate position to the forward position, the shutter mechanism latch release 216 is again in latched engagement with the shutter and arm 240 is moved out of engagement with contact member 238 thereby allowing the switch assembly 220 to return to its said open position thereby allowing the power to the solenoid and motor 158 to be shut down.

It should be noted that film advancing apparatus 202 operates in a similar manner whether the contact members 74 and 78 are automatically engaged by strip 60 or manually by depressing actuator button 32. Therefore, it is conceivable that the automatic engagement feature could be eliminated and the dark slide cover 44 removed by activating the film advancing apparatus 202 manually, i.e., depressing the actuator button.

In FIG. 4, the film advancing apparatus 202 is shown in its rearwardmost position and pick device 222 is in contact with a rear edge of a foremost member of the assemblage which can be either a film unit 42 or the dark slide cover 44. The actuator assembly 100 is shown in the second position, with phantom lines describing such, and the first position having a solid form. When the operator depresses actuator button 32, the actuator assembly 100 pivotally moves into the second operative position wherein the nipple 104 included therein moves against striking surface 106 of resilient member 98. A lower portion of the resilient member 98 is rigidly encased in a cantilevered mounting 224 which permits contact knobs 94 and 96 to move forward into contact with surfaces 88 and 92 respectively. When the nipple 104 moves into contact with striking surface 106, head portion 226 is deflected by the force of the movement of the actuator assembly 100. The head portion 226 has a leading edge 228 which is formed to include a contact surface substantially conforming to a cam surface 230 provided upon a stop member 232. When the resilient member 98 is in the first position, the leading edge 228 is in full contact with cam surface 230. When the actuator assembly 100 is moved from the first position to the second position, leading edge 228 slides against the cam surface 230 which provides a controlled high resistance against depression of the actuator button and introduces to the operator a feel as to how much pressure is necessary to overcome that resistance. When the operator supplies the necessary pressure, the leading edge 228 snaps out of contact with cam surface 230 and deflects beneath the stop member 232. It is this deflection which provides a snapping action generally accomplished by an over-center switch design and contact is initiated at this moment between contact knobs 94 and 96 and contact surfaces 88 and 92 respectively. During the sudden occurrence of the snap action, wherein the leading edge 228 is moved out of contact with cam surface 230, the actuator assembly 100 is moved from a high resistance level to a low resistance level instantaneously, and continued, solid, contact is maintained by the continuance of pressure applied by the operator to the actuator button 32 before the operator has had an opportunity to react to the change in resistance levels and release the actuator button 32 and the requisite period of contact to activate the advancing apparatus completed. Once the operator feels the presence of the resistance offered by the contact, the operator instinctively releases the button whereupon the resilient member 98 returns to the first position thereby forcing the actuator assembly 100 to pivotally return to the first position and break the contact between contact knobs 94 and 96 and contact surfaces 88 and 92.

Figure 6:
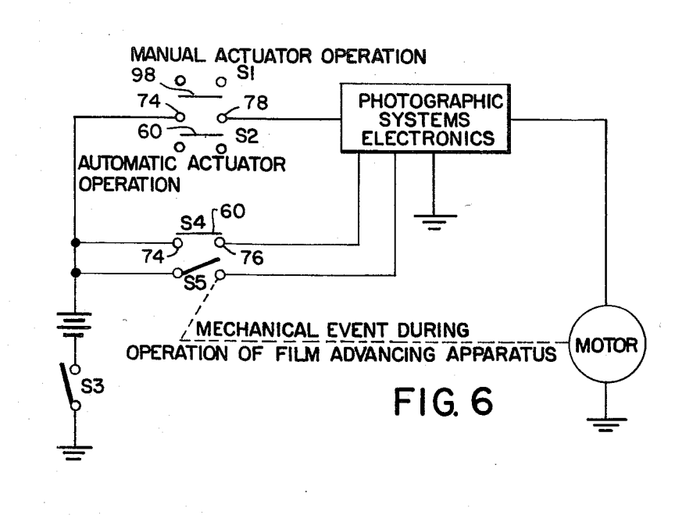
FIG. 6 is a schematic diagram of a control circuit employed in conjunction with the photographic systems circuit of the camera of FIG. 1.

The present invention is defined schematically in FIG. 6 and its operational phase is described as follows:

| Operational Phase | S1 | S2 | S3 | S4 | S5 |
|---|---|---|---|---|---|
| Loading Cassette (cylinder in starting position) | Open | Closed | Open | Closed | Open |
| Securing Cassette (cylinder in starting position and loading door closed | Open | Closed | Closed | Closed | Open |
| Initiate Exposure of Film Units | Closed | Open | Closed | Open | Open |
| During Exposure of Film Units | Open | Open | Closed | Open | Closed |
| Final Film Unit Has Been Exposed (cylinder in terminal position) | Open | Open | Closed | Closed | Open |
| Empty Cassette Removed | Open | Closed | Open | Closed | Open |

Contact members 74, 76 and 78 are designated as common, flash operational inhibitor and film advancing apparatus activator respectively. Switch S1 comprises the manual actuator assembly 100 and the resilient member 98 contact members 74 and 78; switch S2, the strip 60 and contact members 74 and 78; switch S3, the switch included upon loading access door 18; switch S4, the strip 60 and contact members 74 and 76; and switch S5 power on switch assembly 220. In effect, switches $S_1$ and $S_2$ may be considered to be a single switch comprising the spaced contact members 74 and 78 adapted to be selectively contacted by the conductive strip 60 and the resilient member 98 for physically connecting the spaced contact members 74 and 78 thereby electrically activating the film advancing apparatus 202 for removal of a foremost member of the assemblage from within the cassette. It should be noted in the phase chart above, the flash inhibitor is closed when the cylinder 66 is in the starting or in the terminal positions, i.e., when the strip 60 is in contact with the designated contact members. Therefore S4 is closed in those positions and inhibits ignition of artificial illumination by the camera 10 during removal of the dark slide cover and when the cassette is empty.

Although the power source necessary to operate the present invention has been described as included within the film cassette, it should be obvious to one skilled in the art that such a source could be coupled to the camera at a location which is readily accessible to the user whereby the user may readily disconnect such a source to prevent power drainage therefrom as a result of switches S2 and S4 being closed upon the removal of the empty cassette and remaining in the closed position until a fresh cassette is secured within the receiving chamber.

The invention may be practiced or embodied in still other ways without departing from the spirit and essential character thereof. The specific and preferred embodiments described herein are therefore to be considered illustrative and not restrictive, the scope of the invention being indicated by the appended claims and all variations which come within the meaning of the claims are intended to be embraced therein.

What is claimed is:

1. Photographic apparatus for use with a cassette configured to retain an assemblage including at least one film unit and a removeable opaque cover in superposition thereto, comprising:
   a housing including means defining a chamber for removably positioning the cassette in a predetermined location therein;
   loading access means, coupled to said housing for movement between open and closed positions;
   means for removing a foremost member of the assemblage from within the cassette when the cassette is positioned at said predetermined location within said chamber means;
   control means including first and second conductive members actuatable to initiate movement of said removing means when the cassette is positioned in said predetermined location and said loading access means is in said closed position;
   means for activating said control means mounted for automatic movement into a starting position wherein said activating means is in contact with said first and second conductive members for initiating automatic removal of the opaque cover of the assemblage when the cassette is received and secured in said predetermined location and said loading access means moved into said closed position, and for automatic movement out of said starting position wherein said activating means is out of contact with said first and second conductive members; and
   exposure initiating means for activating said control means when said activating means is out of said starting position, said exposure means being manually actuated for movement from an out of contact position into a contact position with said first and second conductive members for initiating exposure and removal of the film unit from within the cassette.

2. The photographic apparatus as defined in claim 1 wherein said exposure initiating means comprises:
   actuator means manually actuated for movement from a first position wherein said exposure initiating means is in said out of contact position into a second position wherein said exposure means is in said contact position; and
   means for resiliently biasing said actuator means out of said second position into said first position.

3. The photographic apparatus as defined in claim 2 wherein said biasing means further includes conductive means extending therefrom for contact with said first and second conductive members when said actuator means is in said second position.

4. The photographic apparatus as defined in claim 3 further including stop means, said exposure initiating means further including means cooperating with said stop means to provide snap action movement of said actuator means from said first position into said second position thereby substantially reducing gradual and intermittent contact between said conductive means and said first and second conductive members.

5. The photographic apparatus as defined in claim 4 wherein said control means further includes a third conductive member, and wherein one of said first and second conductive members cooperates with said third conductive member to provide means for selectively prohibiting actuation of a source of artificial illumination when said activating means is in said starting position.

6. The photographic apparatus as defined in claim 5 wherein said activating means further includes a conductive strip configured and arranged for contact with said prohibiting means when said activating means is in a terminal position.

7. The photographic apparatus as defined in claim 1 wherein said apparatus further includes means responsive to removal of the cassette from within said chamber means for enabling said activating means to return to said starting position.

8. Photographic apparatus for use with a cassette containing a plurality of sheet-like members including at least one film unit and an opaque cover, the opaque cover being located in lighttight relation with the film unit, comprising:
   means for defining a film chamber adapted to receive the cassette;
   loading access means connected to said film chamber for movement between an open position wherein the cassette may be inserted into said film chamber and a closed position;
   film advancing means mounted in position to engage one of the sheet-like members and move it out of the cassette;
   a motor;
   means for transferring energy from said motor to said film advancing means to move one of the sheet-like members out of the cassette; and
   circuit means connectable to a source of energy and to said motor for energizing said motor, said circuit means including a first normally non-conducting switch adapted to be rendered conductible when said loading access means is moved into said closed position, second switch means located in series with said first switch and including a pair of spaced conductors, said second switch means including means for electrically connecting said pair of spaced conductors such that said motor is electrically coupled to the source of energy upon moving said loading access means into said closed position thereby actuating said film advancing means to move one of the sheet-like members from the cassette, said connecting means including means responsive to operation of said motor for automatically rendering said second switch means non-conductive, and said second switch means further includes manually operable means moveable into contact with said pair of spaced conductors to electrically couple said motor to the source of energy when said loading access means is in said closed position, thereby actuating said film advancing means again to move another sheet-like member from the cassette.

9. A self-developing photographic camera for use with a film cassette configured to retain a stacked array of discrete units including a plurality of photographic film units each including a processing fluid and adapted for sequential presentation at an exposure plane of the camera, comprising:
   a housing including means defining a chamber for receiving and retaining the cassette at a predetermined location within said chamber means;
   loading access means coupled to said housing and moveable to a given latched position for securing the cassette within said chamber means, said loading access means including an egress for the removal of discrete units from within said camera;
   means for removing each unit from within the cassette when the cassette is positioned and secured in said predetermined location within said chamber means;
   means for receiving discrete units removed by said removing means for processing and transporting the discrete units through said egress to the exterior of said camera;
   drive means coupled to said removing means and said receiving means and actuatable to impart motion thereto;
   control means including a plurality of conductive members rendered operative upon activation to selectively actuate said drive means when the cassette is properly positioned and secured within said chamber means;
   means for automatically activating said control means in response to contact with at least two of said plurality of conductive members and said positioning of the cassette in said predetermined location; and
   manually actuatable means for activating said control means in response to contact with said at least two conductive members, said manual actuatable means being mounted for movement independently of said automatic activating means from a first position, wherein said manual actuatable means is out of contact with said two of said plurality of conductive members to a second position wherein said manually actuatable means is in contact with said two of said plurality of conductive members for activating said control means.

10. The photographic camera as defined in claim 9 wherein said automatic activating means includes an actuator automatically moved into contact with said at least two conductive members in response to removal of the cassette from within said chamber and automatically moved out of contact with said at least two conductive members in response to operation of said drive means.

11. The photographic camera as defined in claim 9 wherein said actuatable means includes a resilient actuator mounted to be manually flexed from said first position into said second position wherein said resilient actuator is in contact with said at least conductive members and resiles to move said manually actuatable member from said second position back into said first position.

12. The photographic camera as defined in claim 9 wherein said receiving means includes a pair of rotatably mounted juxtaposed pressure applying members adapted to receive and advance therebetween a film unit brought into operative relationship therewith by said removing means, at least one of said pressure-applying members having a pinion axially coupled thereto for coupling said receiving means to said drive means for imparting motion to said pressure-applying members in response to actuation of said drive means.

13. The photographic camera as defined in claim 12 wherein said drive means comprises:
  motor means actuable in response to said activation of said control means for driving said receiving means and removing means; and
  a power train coupled to said motor means including means for coupling said power train to said removing means for operation thereof, said power train having a drive gear in enmeshment with said pinion for rotating said pressure-applying member whereby each film unit is processed and advanced through said egress to the exterior of said camera.

14. Photographic apparatus for use with a cassette having a light entrance portion through which photosensitive surfaces included therein may be sequentially exposed, a removeable opaque dark slide cover positioned to prevent the passage of actinic radiation through the entrance portion prior to the sequential presentment of the photosensitive surfaces at an exposure plane of said apparatus, comprising: a housing;
  means defining a chamber included within said housing for removably positioning the cassette at a predetermined location therein for effectively exposing the photosenstive surfaces through the light entrance portion subsequent to removal of the dark slide cover;
  means coupled to said housing mounted for movement between a first position, wherein said chamber means is accessible to receive the cassette, and a second position wherein said means secures the cassette within said chamber means at said predetermined location;
  drive means actuatable to engage and remove the dark slide cover and each photosensitive surface sequentially presented for exposure through the light entrance portion;
  a plurality of conductive means mounted for activation to actuate said drive means when the cassette is in said predetermined location and said means coupled to said housing is in said second position;
  first and second means for activating at least two of said plurality of said conductive means by moving into contact therewith, said first means including an actuator moved into said contact automatically with said at least two conductive means upon removal of a cassette thereby activating said drive means for removal of said dark slide cover upon receiving a new cassette within said chamber means when said means coupled to said housing is moved into said second position, said second activating means being manually actuatable for contact with said at least two conductive means thereby activating said conductive means for removing one of the photosensitive materials subsequent to exposure from within the cassette.

15. A camera for use with film cassettes each having an exposure aperture and initially retaining a stacked array of discrete units aligned behind the aperture, the foremost discrete unit adjacent the aperture comprising a dark slide and other discrete units of the array comprising unexposed film units adapted to be progressively advanced towards the aperture as each foremost of the discrete units is removed from the cassette, said camera comprising:
  means for defining a chamber in which the cassettes may be positioned one at a time with the foremost discrete unit thereof located at the exposure plane of said camera, said chamber having an open end through which the cassettes may be inserted into and removed from said chamber;
  a door;
  means for mounting said door for displacement between a first position, wherein said open end of said chamber is accessible to facilitate the insertion of a cassette into, and its subsequent removal from, said chamber, and a second position wherein said door covers said open end of said chamber;
  electrically energizable means for advancing the foremost discrete unit within a cassette located in said chamber from the cassette; and
  means for selectively coupling said advancing means to a source of electrical energy at least when a cassette is located in said chamber, said coupling means including:
    a first switch arranged to be rendered conductive when said door is displaced from its said first position to its said second position and to be rendered nonconductive when said door is displaced from its said second position into its said first position;
    a second switch in series with said first switch;
    means responsive to the removal of one of the cassettes from said chamber for automatically rendering said second switch conductive when another of the cassettes is subsequently inserted into said chamber and said door displaced from its said first position into its second position whereby said advancing means automatically advances the dark slide of the other cassette from the other cassette, and for automatically rendering said second switch again nonconductive responsive to said advancement of the dark slide from said other cassette; and
    manually actuable means for selectively rendering said second switch conductive whereby film units within the other cassette may be sequentially advanced from the other cassette following their exposure.

* * * * *